Figure 1:
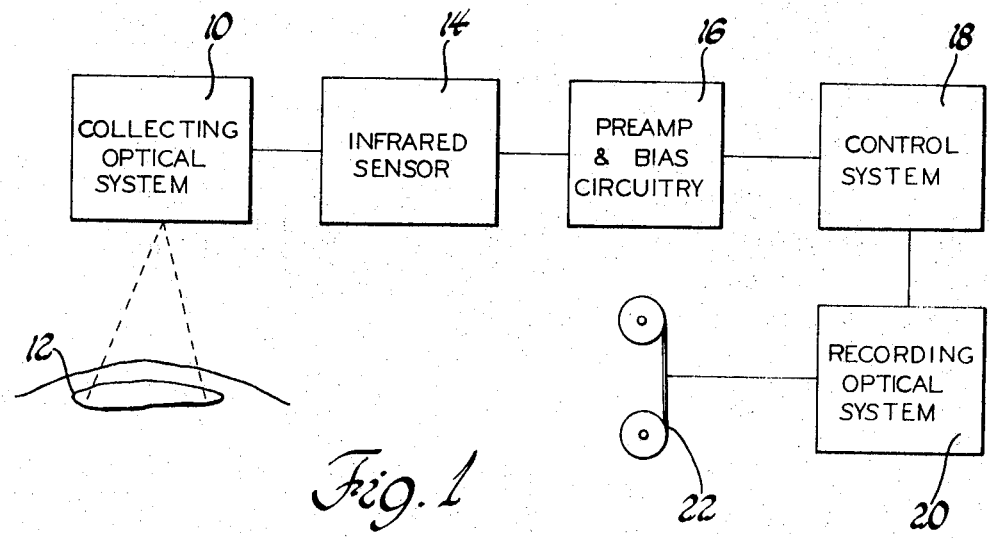

United States Patent [11] 3,614,441

[72] Inventor Clyde A. Boenke
 Ann Arbor, Mich.
[21] Appl. No. 62,219
[22] Filed July 29, 1970
[45] Patented Oct. 19, 1971
[73] Assignee The Bendix Corporation

[54] INFRARED RADIATION DETECTION CIRCUITRY HAVING A CONSTANT BIAS VOLTAGE ACROSS THE SENSOR
8 Claims, 2 Drawing Figs.
[52] U.S. Cl. .................................................. 250/83.3 H,
 250/83.3 R
[51] Int. Cl. ......................................................... G01j 1/00
[50] Field of Search ............................................ 250/83.3 R,
 83.3 H

[56] References Cited
UNITED STATES PATENTS
3,144,554 8/1964 Whitney ...................... 250/83.3 H
3,278,746 10/1966 Fiat ............................... 250/83.3 H
3,418,478 12/1968 Falbel ........................... 250/83.3 H
3,448,267 6/1969 Blythe et al ................... 250/83.3 H Primary Examiner—Archie R. Borchelt
Attorneys—Fisher & Schmidt, William F. Thornton and Plante, Hartz, Smith and Thompson ABSTRACT: Electromagnetic radiation detection circuitry incorporating a sensor which is responsive to radiation in the infrared region of the electromagnetic spectrum. Variations in the detected radiation are sensed as a change in current conduction by the sensor and are strengthened by an amplifying network including an amplifying transistor. A constant bias voltage is maintained across the sensor by the action of a biasing network having a control transistor, which has its base direct coupled to the base of the amplifying transistor, and a balancing resistor, which has a resistance equal to the nominal resistance of the sensor and which in the biasing network simulates the sensor.

INVENTOR.
Clyde A. Boenke
BY Fisher & Schmidt
ATTORNEYS

INFRARED RADIATION DETECTION CIRCUITRY HAVING A CONSTANT BIAS VOLTAGE ACROSS THE SENSOR

This invention relates to electromagnetic radiation detection circuitry adapted, although not exclusively, to sense radiation in the infrared region of the electromagnetic spectrum and to develop amplified and usable output signals reflecting this infrared radiation.

Whenever low-resistance sensors, such as those commonly employed to sense infrared radiation, are to be utilized, by way of example only, for direct photographic imaging by infrared imagery or as it will be hereinafter referred to, by thermal mapping, only a small change in the conductance of the sensor occurs when the usual thermal ground characteristics are sensed. The corresponding small changes in current flow through the sensor are difficult to measure and amplification is therefore required. Necessarily, the amplification must be done over a relatively wide bandwidth and while generating a minimum noise in order to obtain a usable output signal. Capacitive couplings are generally undesirable because DC and slowly varying signal changes cannot be coupled or passed. Other concerns are proper bias for the sensor and protection of the sensor against burnout during operating extremes.

With the foregoing in mind, new and different circuitry is contemplated for amplifying changes in a certain characteristic of a low-impedance sensor.

Also contemplated is circuitry for maintaining in a unique way a relatively constant bias voltage across a low-impedance sensor.

Further contemplated is detection circuitry having amplifying and biasing networks uniquely integrated to provide amplification of low-level signals and the proper operating bias.

A more specific objective is to combine with an amplifying transistor having an infrared sensor in the input thereof a biasing network which by simulating the current flows in the input and the output of the amplifying transistor establishes a relatively constant bias voltage across the sensor.

Other objectives include the provision of circuitry for direct coupling a low-impedance sensor with an amplifier; circuitry affording a direct coupling between an amplifier having a low-resistance sensor in the input and a biasing network which provides operating bias both for the amplifier and the low-resistance sensor;

circuitry including an amplifying network capable of strengthening a low-level signal with a minimum of noise generation; and circuitry for amplifying changes in the operating characteristics of a low-resistance sensor and including a built-in provision for protecting the sensor from damage from operating extremes.

Figure 2:
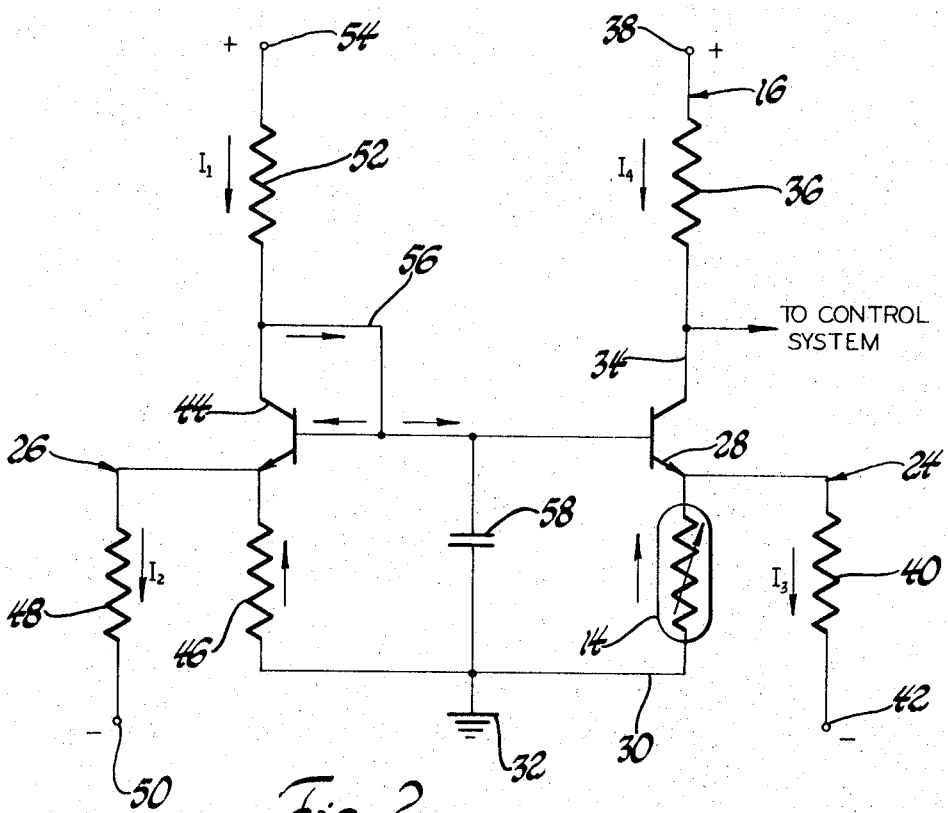

The foregoing and other objects and advantages of the invention become apparent from the following description and from the accompanying drawings, in which:

FIG. 1 is a block diagram of thermal-mapping apparatus incorporating principles of the invention; and FIG. 2 is a diagram of detection circuitry for the FIG. 1 system and depicts amplifying and biasing networks for strengthening signals derived from an infrared sensor employed in the FIG. 1 system, all being constructed according to the invention.

Referring to the details of the drawing and first to FIG. 1, the apparatus portrayed is for direct photographic imaging in the nonvisible region of the electromagnetic spectrum.

With this apparatus, the infrared radiation emitted by the earth's surface is used to obtain a thermal image of the earth's surface and is translated into varying shades of gray on photographic film. This apparatus can be used for many purposes, such as nighttime mapping over enemy territory, and analyzing fire, water, and soil conditions.

This thermal-mapping apparatus is generally well-known and therefore will be discussed only in sufficient detail to understand the principles of the invention. Briefly then for thermal-mapping purposes, the apparatus will be suitably mounted on an aircraft and includes an appropriate collecting optical system 10 capable of scanning a scene, such as that at 12, and transferring variations in the infrared radiation from the scene 12 to an electromagnetic radiation sensor; e.g., an infrared detection sensor, designated generally at 14. These infrared radiation variations are converted to voltage variations and amplified by preamplifying and biasing circuitry denoted generally at 16. A control system assigned the numeral 18 includes provision for additional amplification and whatever processing is required for these voltage variations and for converting them to visual equivalents. For instance, these voltage variations can be fed through an appropriate glow modulator driver, such as a high-voltage power transistor, and to some suitable type of high-frequency response glow modulator; e.g., a Sylvania R1168 gaseous discharge crator tube. In this way infrared radiation variations are changed to radiation variations in the visible wavelength region of the spectrum. The image from the glow modulator arc is then reproduced after transfer through a recording optical system 20, which includes appropriate mirrors, as density variations in the film forming part of a film cassette 22.

Considering now the FIG. 2 circuitry, the infrared sensor 14 is illustrated or a variable impedance and can be of any known type. In the FIG. 1 system a cryogenically cooled semiconductor, sensor 14 is employed. The semiconductor material was mercury-cadmium-telluride. Cryogenic operation was at 77° K. and was provided by a liquid nitrogen coolant and a vacuum insulated dewar. In operation, the resistance of the infrared sensor 14 decreases with an increase in the temperature, which occurs when the sensed infrared radiation increases. When the sensor's resistance decreases, there is an increase in current flow through the sensor 14.

Characteristically, an infrared sensor has a fixed high-conductance; e.g., $50/1,000^{th}$ of an mho, which only changes a small amount; by way of example, one micro-mho, as thermal ground characteristics change. Therefore, as can be appreciated, it is difficult to measure these changes without amplification, which is a problem because the noise generated by the usual amplifier renders any amplified signal unusable. Also, if an instantaneous measurement is to be made to detect an abrupt terrain change as when flying from land to water, any kind of capacitive coupling would average this change and render it nonrepresentative of the crossover. Furthermore because of the low-resistance aspect of the sensor 14, current surges cannot be tolerated, since they would irreparably damage the sensor 14. The FIG. 2 circuitry overcomes these problems and others by combining an amplifying network 24 and a biasing network 26, which together facilitate the strengthening of these small current variations developed by the infrared sensor 14 into usable output signals.

Continuing to refer to the FIG. 2 circuitry and considering first the amplifying network 24, there is included an amplifying device, such as an NPN-type transistor 28, which operates as a class A amplifier and is arranged in a common base configuration. In this configuration, a base-emitter input circuit 30 has the infrared sensor 14 connected between ground at 32 and the emitter of the transistor 28 and a base-collector output circuit 34 with a load resistor 36 connected to the collector of the transistor 28. Current flow changes through the load resistor 36 result in corresponding voltage variations that are fed as output signals to the control system 18. The collector of he transistor 28 is connected to a positive voltage source at 38, whereas the emitter of the transistor 28 is connected through a relatively high resistance 40 to a negative voltage source at 42. The high resistance 40 and the negative voltage source at 42 combine to provide, in effect, a constant current source. By way of example and without limitation, this resistance can be 1,800 ohms, the negative and positive voltages 7.5 volts and the transistor 28 can be type 2N4401.

The biasing network 26, which provides the operating bias for the transistor 28 and also for the infrared sensor 14, includes a control device, such as a NPN-type transistor 44 connected as a diode. The control transistor 44 is selected so as to have the same characteristics as the amplifying transistor 28 since the biasing network 26 is to simulate all of the various currents in the amplifying network 24. For this reason, the voltages and resistances used by amplifying network 24 are duplicated and a substantially identical transistor is employed. Hence, the control transistor 44 has a balancing resistor 46 with a resistance equal to the nominal resistance of the infrared sensor 14 connected between its emitter and the ground at 32. The control transistor 44 also has its emitter connected to a constant current source similar to that provided by the high resistance 40 and the negative voltage source at 42. This constant current is provided by a relatively high resistance 48 and a negative voltage source denoted at 50. To complete the simulation the collector of the control transistor 44 is connected through a resistance 52, which has a value equal to that of the load resistor 36, to a positive voltage source at 54. Then to render the control transistor 44 operative as a diode, a shunt 56 connected between its collector and base.

To complete the circuitry the networks 24 and 26 are direct coupled. This is done by joining together as the bases of the amplifying transistor 28 and the control transistor 44.

The current flow through the control transistor 44 and the balancing resistor 46 will, in operation, generate noise currents and voltages over a broad frequency spectrum which, as can be appreciated, are detrimental when such weak signals as those derived from the sensor 14 are to be amplified. For this purpose, a filter capacitor 58 is connected between the bases of the transistors 28 and 44 and the ground at 32 and will operate to bypass to ground all of the high-frequency noise contributions of transistor 44 and its associated resistors and a portion of the high-frequency noise produced by transistor 28.

The NPN-type transistors 28 and 44 and polarities shown are for demonstration purposes. PNP-type transistors can, of course, be used with opposite polarities, if preferred.

In operation, the FIG. 2 circuitry will be assumed for convenience to have the current flows and the directions indicated by the arrows. As mentioned, the biasing network 26 since it has the same circuit parameters as the amplifying network 24 and also the control transistor 44 has the same characteristics as the amplifying transistor 28, these current flows will be the same. For instance, the collector currents $I_1$ and $I_4$ and the emitter currents $I_2$ and $I_3i$ which, respectively, represent the current flows for the control transistor 44 and the amplifying transistor 28 will be the same, except the collector current $I_4$ will include the current changes generated by the resistance variations of the infrared sensor 14 when operating in a sensing mode.

Initially, the emitter of the control transistor 44 will be slightly negative, and hence, it will commence conduction. The collector current $I_1$ will split with part proceeding by way of the shunt 56 to both of the bases of the two transistors 44 and 28. The Beta factor of the transistor 44 will determine the relative amounts of these currents and is selected accordingly. The base currents, of course, will be small and they will preferably be substantially equal. The current $I_2$ will be made up of the portion of the collector current $I_1$ not shunted, the base current, and the current flowing through the balancing resistor 46. Being mindful that the two transistors 28 and 44 have the same characteristics they will each, therefore, have the same base to emitter voltage drop. With base current now being supplied to the amplifying transistor 28, the amplifying transistor 28 will commence to conduct. Since the emitter currents will be substantially the same, the voltage imposed across the infrared sensor 14 will be the same as the voltage across the balancing resistor 46 and, of course, will be substantially constant. It should be noted that the amplifying transistor 28 will become conductive when the voltage across the balancing resistor 46 and the voltage across the infrared sensor 14 are approximately equal. At this time the two transistors 28 and 24 have the same base voltages, the same base to emitter voltage drops and also the same emitter voltages since they have each the desired same emitter currents.

When the infrared detector 14 is exposed; e.g., to increased infrared radiation, its resistance will decrease and there will be a corresponding current increase, which as has been discussed, is virtually impossible to measure because the resultant changes in the conductance changes of the infrared sensor 14 are very small. By having a constant voltage across the infrared sensor 14 and with the constant current source presented by the substantially large resistance 40 and the negative voltage source 42 and the current $I_3$ will remain substantially constant and is made-up of the collector current $I_4$, the current through the infrared sensor 14 and the base current. Since the collector current $I_4$ is much larger than the base current, it will contain most of the variations sensed by the infrared sensor 14. Consequently, the signal fed to the control system 18 and taken across the load resistor 36 will represent amplified versions of these variations in the sensor current.

The foregoing describes the normal operation of the FIG. 2 circuitry. If, however, the temperature, of the infrared sensor 14 increases to a point where there is substantially a zero impedance or resistance, as would be the case with depletion of cryogenic coolant, the emitter of the amplifying transistor 28 will, in effect, be connected to the ground at 32; then, the amplifying transistor 28, which requires a slightly negative emitter voltage, will turn off since the base to emitter voltage for the transistor 28 is inadequate to maintain the amplifying transistor 28 on. Therefore, substantially all of the current $I_3$ will go through the infrared sensor 14 and is selected in accordance with the operating characteristics of the infrared sensor 14 so as to not damage the sensor 14. Hence, the current through the infrared sensor 14 is limited to the selected safe $I_3$ current value.

From the foregoing, it will be appreciated that by this FIG. 2 circuitry, a constant voltage is maintained across the infrared sensor 14 so that the small variations in the impedance of the infrared sensor 14 can be converted to a usable amplified signal. This is all done without capacitive couplings and without interference from the noise generated by the control transistor 44 and the balancing resistor 46. Also, as those versed in the art will appreciate; the principles of the invention can be applied to other than thermal mapping and are not restricted to infrared sensors but can be utilized with any kind of sensor of its equivalent.

What is claimed is:

1. Circuitry comprising sensing means operative to vary a current conducting characteristic thereof in accordance with a sensed property, means amplifying changes in the current conduction by the sensing means, and biasing means maintaining a certain relatively constant voltage across the sensing means, the biasing means including a balancing element having a current conducting characteristic substantially the same as the current conducting characteristic of the sensing means, and being operative to simulate the current flows through the amplifying means so as to establish the certain relatively constant voltage across the balancing element and also being operative to connect the balancing element in circuit with the sensing means so that the certain relatively constant voltage is maintained across the sensing means.

2. Circuitry as described in claim 1, wherein the amplifying means includes an amplifying device having an input circuit including the sensing means and an output circuit connected to a load and the biasing means simulates the current flow in the amplifying device's input and output circuits.

3. Circuitry as described in claim 2, wherein the biasing means further includes a control device operative to establish a predetermined current flow through the balancing element so as to develop the certain relatively constant voltage thereacross.

4. Circuitry comprising means sensing electromagnetic radiation and having a certain impedance value, the sensing means being operative to vary the impedance thereof in accordance with the sensed radiation and correspondingly the current conduction thereby, means amplifying the changes in the current conduction by the sensing means, the amplifying means including an amplifying device having an input circuit including the sensing means an output circuit connected to a load, biasing means maintaining a certain constant voltage across the sensing means, the biasing means including a balancing element having an impedance substantially equal to the certain impedance value of the sensing means and a control device operative to establish a current flow through the balancing element so as to develop the certain relatively constant voltage thereacross and also operative to connect the balancing element in circuit with the sensing means so that the certain relatively constant voltage is also maintained across the sensing means.

5. Circuitry as described in claim 4, and further including filtering means arranged in circuit with the biasing means so as to attenuate noise producing frequencies generated thereby.

6. Circuitry comprising means providing a constant current; means providing a constant voltage; an infrared radiation sensor constructed and arranged so that the resistance thereof varies from a certain value with the infrared radiation sensed thereby and correspondingly the current conduction thereby; means amplifying changes in the current conduction by the sensor; the amplifying means including am amplifying transistor having emitter, collector and base electrodes, the amplifying transistor having the input base-emitter current thereof arranged so that the sensor and the constant current means are connected in parallel therein and the output base-collector circuit thereof is connected to the constant voltage means through a load; biasing means maintaining a certain relatively constant voltage across the sensor; the biasing means including a balancing element having a resistance substantially equal to the certain resistance value of the sensor, a control transistor having base, emitter, and base electrodes and arranged so as to have the base electrode thereof connected to the base electrode of the amplifying transistor, the emitter electrode thereof arranged to connect in parallel the balancing element and the constant current means and the collector electrode thereof connected to the constant voltage means, and a shunt connection between the collector and base electrodes, the control device being operative to establish current flows in the biasing means corresponding the current flows in the amplifying means so as to develop the certain relatively constant voltage across the balancing element and to connect the balancing element in circuit with the sensor so that the certain relatively constant voltage is also maintained across the sensor.

7. Circuitry as described in claim 6, wherein the infrared radiation sensor is constructed to pass a predetermined maximum current and the constant current means is arranged to provide a constant current of a value not exceeding the predetermined maximum current.

8. Circuitry as described in claim 7, and further including filter capacitive means connected to the base electrodes of both the amplifying transistor and the control transistor so as to attenuate noise producing frequencies generated by the biasing means.